March 14, 1967
R. E. STOKELY
3,309,154
RESILIENT CENTER BEARING MOUNT
Filed June 8, 1964
2 Sheets-Sheet 1
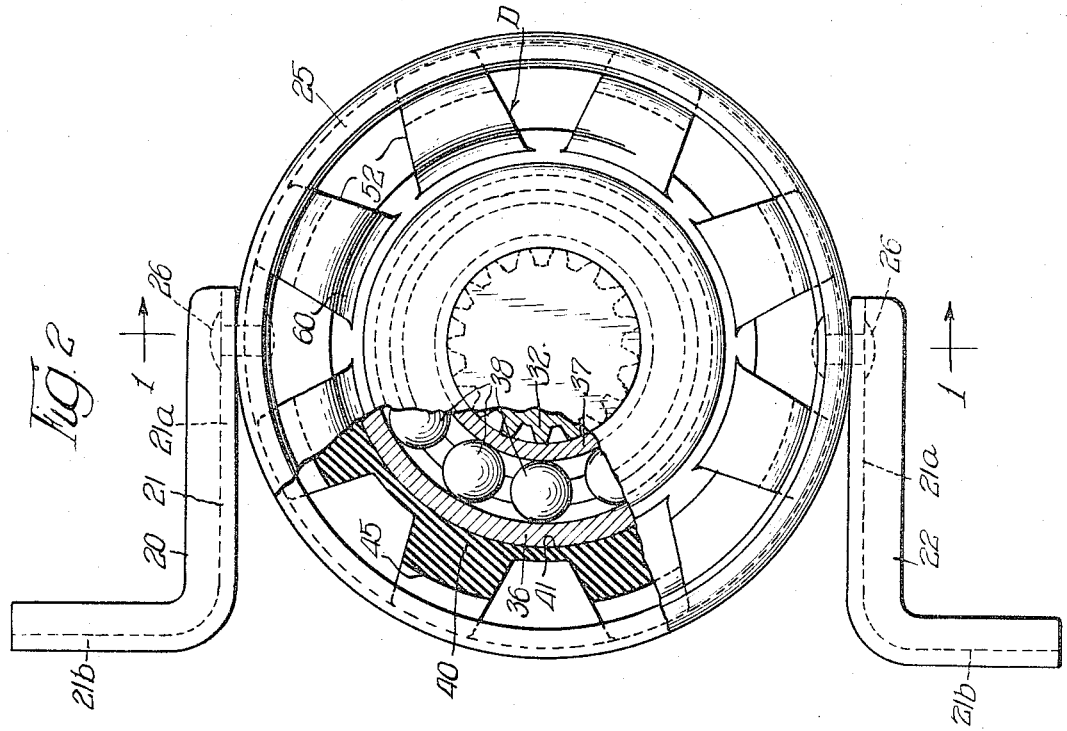
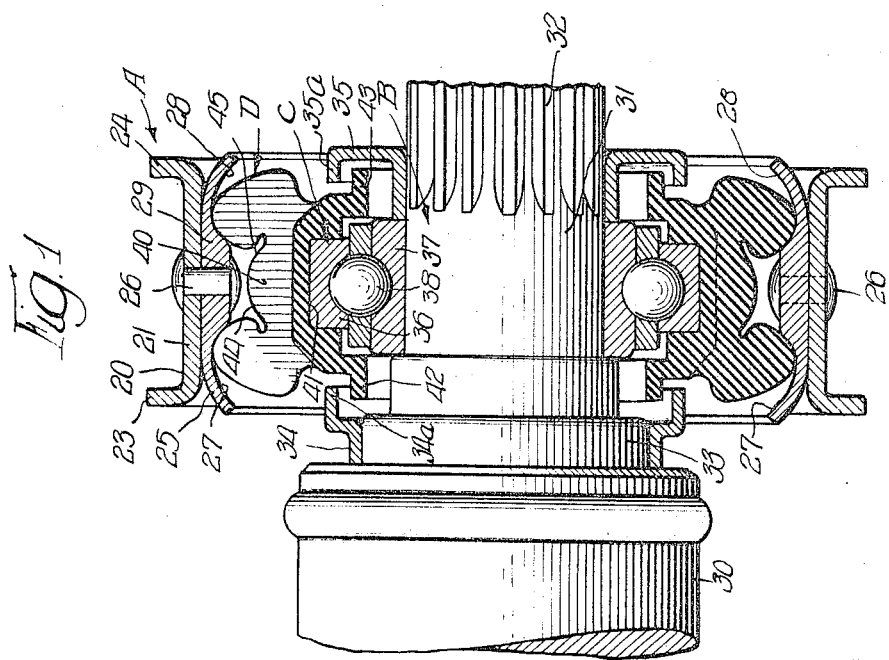
INVENTOR.
Raymond E. Stokely,
BY
Joseph W. Malleck
Atty.

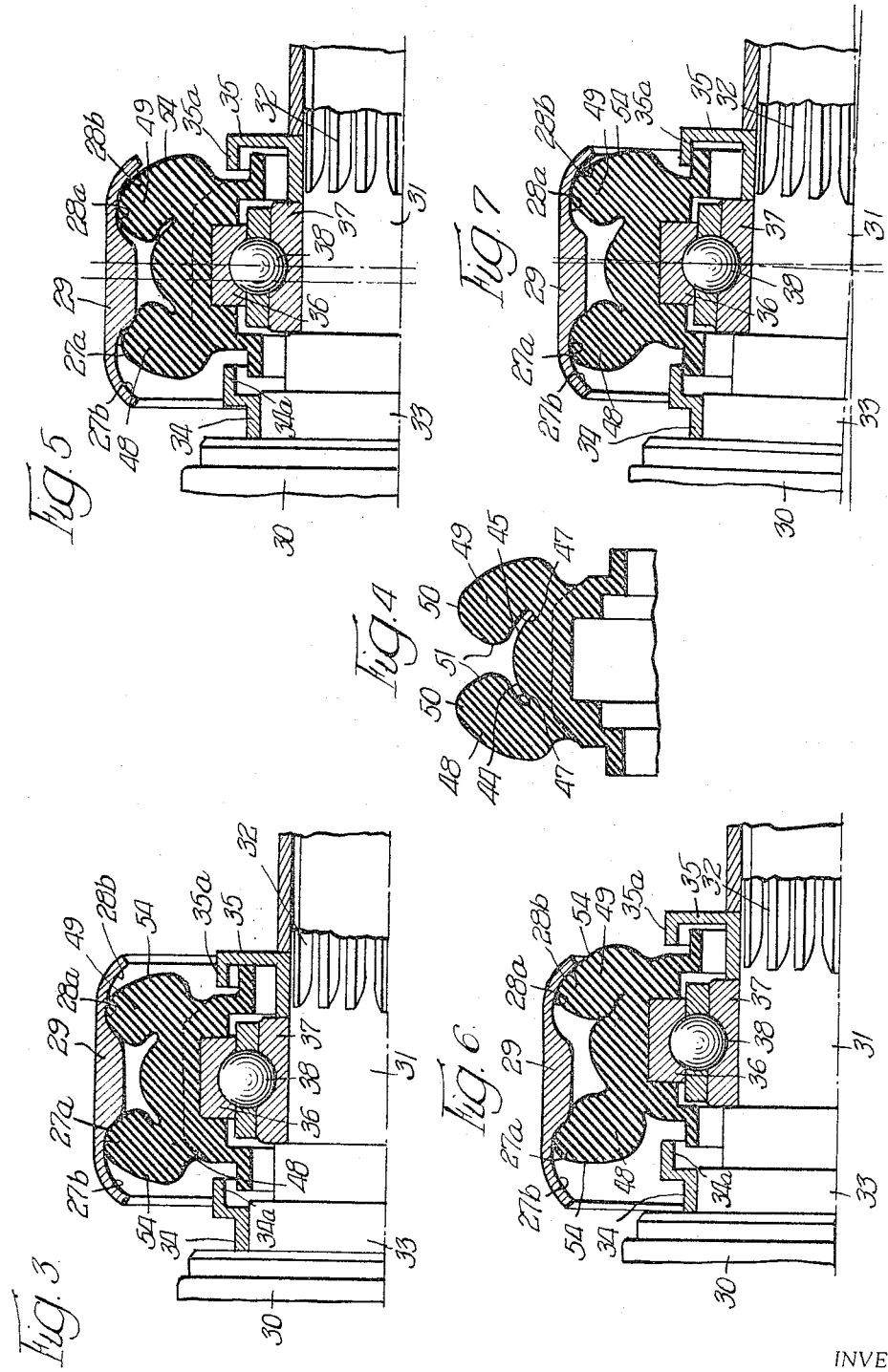

United States Patent Office 3,309,154
Patented Mar. 14, 1967

3,309,154
RESILIENT CENTER BEARING MOUNT
Raymond E. Stokely, Rockford, Ill., assignor to Borg-Warner Corporation, Chicago, Ill., a corporation of Illinois
Filed June 8, 1964, Ser. No. 373,200
7 Claims. (Cl. 308—184)

This invention relates to shaft mountings, and particularly to mountings of the type which may be utilized in the support of a split driving shaft such as used in automotive vehicles (split driving shaft being comprehensive to include any series of rotary driving sections which are connected by any series of joints).

Due to the running loads in a vehicle drive shaft, dynamic forces act upon the shaft and upon a center bearing support member when used and tend to transmit vibration or noise through the bearing and its support and into the vehicle body. The dynamic forces may comprise secondary couple loads which result from transmitting rotary power at an angle, as well as forces resulting from slight unbalance or misalignment of connected parts. These vibrations are best isolated by the use of a relatively radially soft mount for supporting the drive shaft center bearing to the vehicle frame or under body.

Heretofore, prior constructions have contemplated the use of a rubber ring disposed between a fixed bracket and a bearing assembly, said rubber being arranged in different mannerisms to provide rubber-in-shear or rubber-in-compression. However, none of these prior constructions have afforded any successful degree of angular or axial movement between the bracket and bearing (the angular or axial adjustments must be provided without changing the degree of damping effect which was designed into the resilient mount). It is important to provide such flexibility of movement of the shafting within said bearing mount for many reasons, among which are: (A) there is an inherent stack-up of tolerances between parts in a driven line when assembled which vary within predetermined limits. Such tolerances change the design dimension of the drive line and can best be accommodated by a center bearing which adjusts during assemblage, (B) a limited degree of concentric misalignment is inherent in drive lines between the bearing mount and the shafting rotating therein and if not accommodated contributes to an unsatisfactory assembly, and (C) a reduction in the number and models of angular brackets utilized in supporting split drive lines by standardization of such pieces enabling the center bearing mount to accommodate angular variations up to as much as 12 degrees.

Therefore, a primary object of this invention is to provide an improved resilient center bearing mount for split shaft assemblage, such mount accommodating both axial as well as angular movement between the support and bearing.

Another object is to provide a resilient center bearing mount which not only has a successful transmissibility ratio comparable to that of prior art constructions but also has the ability to absorb angular and axial misalignment to prevent destruction and pop-out of the resilient member during operation.

Yet another object of this invention is to provide a resilient center bearing mount which maintains uniform transmissibility and radial support for the shafting extending therethrough while at the same time accommodating axial and angular movement between the bearing and support.

Other objects and advantages of this invention will become apparent from the following detailed description taken in connection with the accompanying drawings in which:

FIGURE 1 is an elevational view of a split-shaft center bearing assembly employing the principles of the invention herein;

FIGURE 2 is a central sectional view taken substantially along line 2—2 of FIGURE 1;

FIGURE 3 is a fragmentary sectional view like that in FIGURE 2 of a portion of the center bearing mount illustrating the condition of the resilient ears of the insulating ring as they are stressed during assembly with zero degree of misalignment between the shaft and bracket;

FIGURE 4 is a fragmentary view of a portion of the resilient insulating ring illustrating the condition of the resilient ears in their unflexed state;

FIGURE 5 is a view like that in FIGURE 3 illustrating the condition of the resilient ears when an intermediate degree of axial alignment is incurred;

FIGURE 6 is a view like that in FIGURE 3, illustrating the condition of the mount when a maximum degree of axial misalignment is incurred; and FIGURE 7 is a view like that in FIGURE 3, illustrating the condition of the mount when a degree of angular misalignment is incurred.

Turning now to the drawings and more particularly to FIGURES 1 and 2, there is shown a preferred embodiment of this invention and broadly comprises a bracket A secured to a fixed portion of the vehicle and through which extends the rotary shaft means B; a bearing means C, disposed about the shaft is resiliently mounted within the bracket A by a unique insulating ring D.

In more particularity, the bracket A comprises an annular housing 20 having L-shaped feet 21 and 22 attached at opposite diametrical sides thereof. Each of the feet has one leg 21a attached at diametrically opposite points of the housing and another leg 21d lying in a common plane for attachment to the vehicle or other fixed member (not shown). The housing has annular lips 23 and 24 at opposite edges thereof which serve to rigidify the structure; an annular contoured retainer 25 is concentrically nested within the housing 20 having its outer peripheral portion secured to the interior part of the housing by suitable fasteners such as rivets 26. The retainer has a pair of axially spaced grooves 27 and 28 formed on the interior surface thereof, the grooves being spaced by an annular shoulder 29 which is commensurate in width to the width of each of the grooves.

Shaft means B, as shown in FIGURE 1, comprises a shaft section 30 having a reduced terminating portion 31 upon which is formed a plurality of splines received in complementary splines of a slit-joint (not shown). The portion of the shaft means shown may comprise a driving shaft comprised of any number of shaft sections interconnected by universal joints, or the invention may be utilized in the environment of an overhead shaft system which does not include universal joints. Shaft means B has an intermediate stepped portion 33 upon which is mounted an annular dirt shield having an annular lip 34a radially spaced outwardly from the shaft 31. The bearing means C has inner and outer annular races 36 and 37 of differential widths; between the races is disposed a plurality of rollers 38 to provide an anti-friction support between said races. The inner race 37 is tightly fitted about the outer surface of the shaft portion 31 and outer race 36 is held against rotation by way of insulatnig ring D.

The insulating ring D is comprised of a unitary body of resilient material such as soft rubber. The ring has an annular central body 40 provided with a central annular groove 41 within which is received the outer race 36 of the bearing and has a pair of radially inwardly depending rubber flanges 42 and 43 adapted to nest inwardly but in spaced relationship with the dirt shields 34 and 35. The outer periphery of the body 40 is provided with a pair of generally converging biased annular surfaces 44 and 45 each facing generally axially and radially outwardly. From each of the surfaces 44 and 45 extends a plurality of equi-circumferentially spaced resilient ears 46. The ears, with respect to those extending from the opposite surface, are axially aligned in pairs and each are defined with a slight fold 47 therein, the folds on opposite ears of each pair being inwardly of the device (although the invention may comprise ears folded outwardly). Each ear 46 is comprised of a neck portion integrally joined to the body 40 and carries a head portion 49, the head and neck being folded inwardly. The head portion has a nose portion 50 adapted to engage the retainer in a rockable manner and a chin portion 51 effective to engage one of the biased surfaces 44 or 45 upon being flexed thereagainst. Each of the nose portions is generally rounded so as to be capable of rolling on the interior of the grooves 27 or 28 without placing the ears in compression resulting from angular or axial adjustment.

As shown in FIGURE 2, the sides 53 of each ear are generally radially directed, the spaces between sides of adjacent ears are generally commensurate to the width of one ear. This enables the rubber insulating ring to have a highly reduced content of material aiding in economy and also affording, for the first time, the angular and axial freedom to adjust for each of said ears which would not be available with a solid annular ring such as is characteristic of the prior art.

To accommodate axial movement of the bearing means C relative to the retainer 29, it can best be illustrated by discussing the movement of each pair of ears which act in synchronization, every other pair acting in similar fashion. In FIGURE 4, the unflexed condition of the ears upon the body 40 is illustrated and shows the natural condition prior to assembly within the device. When the insulating ring is assembled, as shown in FIGURE 3, the ears are slightly spread apart by interposition of shoulder 26 tending to squeeze the nose portions 50 axially apart with respect to each pair. This has the advantage of increasing the axial distance through which the pairs of ears will accommodate misalignment or adjustment. If only a slight axial adjustment is required for the particular application, each pair of ears may be assembled without any spreading by reducing the width of the shoulder 26 to be commensurate with the spacing between the unflexed nose portions 50 as shown in FIGURE 4. In the assembled position, the nose portions 50, rest resiliently against the inner curvature 27a and 28a of each of said respective grooves on the retainer 29. The back portion of each ear is provided with a curvature generally commensurate to that of the grooves 27 and 28, but is spaced from the outer curved portion 27b and 28b of said grooves in the zero adjustment position of FIGURE 3. In the neutral position of FIGURE 3, the rubber of the insulating ring is not under a great deal of compression load, but rather the ears are primarily experiencing stress resulting from the folding of each ear and the uniform radial support of a shaft extending therethrough. In all subsequent axial or angular adjustments, uniform transmissibility is achieved (transmissibility here being defined to means the ratio between the degree of vibration transmitted by metal-to-metal contact as compared to the vibration transmitted with the structure herein utilized).

As the bearing C, and therefore the central body 40 of the insulating ring, is moved in one axial direction (see FIGURE 5) to an intermediate degree, the trailing ear (taken with respect to the direction of movement) will be urged to begin bending about its neck portion 48 to a small degree; this is in contrast to the action which takes place in the leading ear which is not a bending action, but rather the leading ear tends to roll on the annular surface 49 with the back portion 54 of each ear coming into a greater degree of contact with the outer curved portion 28b of the retainer 29. This synchronized bending and rolling action provides for an automatic shift of the rubber column supporting the radial loads from one ear to the other in a gradual manner. Placing the trailing ear under a greater bending action obviously weakens its capacity to withstand radial loads, and the placement of the leading ear in a greater position of compression increases its capacity to withstand radial loads.

The full extent of axial adjustment is shown in FIGURE 6. In such position the leading ear will have the chin portion 51 in contact with the respective biased surface 45; the chin portion touches the surface 45 in advance of the moment when the full axial position of FIGURE 6 is assumed and further axial movement to that as shown in FIGURE 6 provides a compression of the chin portion slightly against a surface 45. In the extreme position, the back portion 54 of the leading ear is tightly in contact with the outer curved portion 28b of the groove 28 of the retainer 29. The cooperation of the surface 28b and the resilient surface 45 provides an axial limit or stop. This has the advantage of obviating abrading action of the chin portion against surface 45 if the axial limit of the retainer were not present.

In the extreme position of FIGURE 6, the trailing ear has gone to a maximum bending stress generally incapable of supporting a great deal of radial load. The leading ear having increased its general transverse rubber section by having the chin portion in tight contact with surface 45, substantially assumes a great portion of the radial load.

To accommodate angular misalignment between the bearing means C resulting from shaft run-out and the bracket A (see FIGURE 7), the pairs of ears which extend generally outwardly at right angles to the plane of run-out of the shaft will undergo a twisting action, whereas the pairs of ears which generally lie within the plane of shaft run-out will undergo a general axial adjustment as that described in connection with the previous figures. In FIGURE 7 the angular misalignment is schematically illustrated as being very slight and accordingly the distortion of the ears will be slight as illustrated. However, under full maximum angular run-out, that can be accommodated, the ears disposed generally close to the plane of shaft run-out will appear as that shown in FIGURE 5. The twisting of each ear about its general radial extent is permitted, first by the liberal spacing between the adjacent ears extending outwardly from each surface 44 or 45, and secondly, the design of each ear to have a width generally small enough so that the neck portion 48 has an integral section with the surface 44 or 45 which is generally a straight line. If the width of the neck portions were made larger, the integral connection would assume a semi-tube effect which would hinder the ability of the ear to twist about its neck portion. In the specific embodiment of the application herein, a maximum of 12 degrees may be experienced for angular adjustments.

With the construction of the embodiment herein, transmissibility between the bracket and bearing means is maintained uniform without changing the radial spring rate of the resilient ring D.

While I have described my invention in connection with one specific embodiment and other alternative suggestions thereof, it is to be understood that these are by way of illustration and not by way of limitation and the scope of my invention is defined solely by the appended claims which should be construed as broadly as the prior art will permit.

I claim:

1. A bearing support, for a shaft comprising: bearing means adapted to rotatably journal said shaft therein, an annular retainer surrounding said bearing means in radially spaced relationship, a bracket fixedly supporting said retainer, and annular insulating means disposed between said retainer and bearing means effective to maintain uniform transmissibility therebetween while accommodating axial and angular displacement of said bearing means relative to said retainer, said insulating means particularly comprising a plurality of flexible ears extended generally, radially, outwardly and arranged in axially spaced pairs, each pair of ears cooperating as a single column of rubber to support radial loads between said retainer and bearing means, each pair of ears having free rocking contact with said retainer which permits ears to shift contact relative to their retainer during displacement of said bearing means relative to said retainer.

2. A split shaft bearing support, comprising: a support fixture, an annular retainer carried by said fixture having an annular shoulder, annular bearing adapted to support a rotatable shaft extending therethrough and disposed within but spaced from said retainer, an insulating ring supporting said bearing within said retainer and comprised of a unitary resilient body, said body having at least one pair of converging surfaces each oppositely facing outwardly on a bias with respect to an axis of rotation of said bearing, one ear of each pair extending outwardly from each of said surfaces with each ear folded inwardly and having a nose portion in engagement with said shoulder of said retainer during neutral condition of the support, said ears being free to rock against said retainer to maintain uniform transmissibility upon limited relative axial movement between said retainer and bearing whereby movement in any axial direction will cause one of said ears to be tilted outwardly thereby reducing its effectiveness to carry radial loads while at the same time the opposite ear will rock against said retainer to bring said ear into contact with one of said converging surfaces to increase its effectiveness to support radial loads thusly maintaining uniform radial support and transmissibility.

3. A split shaft bearing support, comprising: a fixed bracket carrying an annular retainer provided with at least one pair of axially spaced rocking surfaces; a bearing and a unitary annular insulting member disposed within said retainer and supporting said bearing therein while accommodating both relative axial and angular movement of said bearing with respect to said fixed retainer, said insulating member being particularly characterized by an annular web portion having circumferentially arranged and oppositely facing biased surfaces, said surfaces facing both radially and axially outwardly of said assemblage, and at least one pair of ears each extending from one of said web surfaces rollingly engaging one of said retainer surfaces, said ears being effective to twist or roll for accommodating axial or angular displacement of said bearing relative to said retainer.

4. A bearing support comprising: a fixed bracket carrying an annular retainer, a unitary insulating ring comprised of a resilient material and characterized by an annular web provided with a plurality of equi-circumferentially spaced pairs of resilient ears extending outwardly from said web and inter-engaging with said retainer, and a rotary bearing having radially inner and outer races between which is disposed a plurality of equi-spaced rollers, the outer race being snugly received within said insulating ring and effective to shift both axially and angularly the web of said insulating ring, each said ear being comprised of a neck extending outwardly generally perpendicular to a biased surface of said web and having a head portion including a nose and a chin, the unflexed head extending generally parallel to an associated surface of the web and having the nose thereof rockably engaging said retainer, said chin being effective as a stop to limit axial adjustment, each pair of said ears being effective to provide equal radial support between said bracket and bearing and effective to shift said radial support from one ear to the other of each pair upon movement of the bearing relative to the bracket without increasing transmissibility therebetween.

5. A flexible bearing mount, comprising: an annular bearing having an outer race; an annular resilient body secured about said race having a plurality of equi-circumferentially spaced resilient ears extending generally radially outwardly therefrom, said ears being arranged in said ears in contact therewith, one ear of each pair being folded oppositely; and an annular retainer surrounding said ears in contact therewith, one ear of each pair being effective to increase the folding condition while the opposite ear decreases the folding condition as relative axial movement takes place between said retainer and bearing whereby the radial spring rate of said resilient body is uniformly maintained under all operating conditions.

6. A flexible bearing mount as in claim 5, in which said ears are circumferentially spaced apart a distance generally commensurate with the width of each ear whereby substantially less material is required for fabrication of said resilient body and said ears are enabled to twist in response to relative angular movement between said bearing and retainer.

7. A flexible bearing mount for a rotary shaft comprising: an annular bearing adapted to be mounted about said shaft and having an outer race, said bearing being subject to secondary couple loads and rotary unbalance inherent in the rotation of said shaft; an annular resilient ring having a central body mounted about and secured to the outer race of said bearing and having a pair of generally converging annular surfaces, said ring further comprising a plurality of equi-circumferentially spaced resilient ears, said ears being arranged in pairs with the ears of each pair folded opposite to the other and each ear having a section connecting with one of said surfaces approximating a flat plane whereby said ears may twist more freely to accommodate angular movement between said bearing and retainer, an annular retainer surrounding said ears and in contact with each ear, each pair of ears cooperating to roll against said retainer upon axial movement of the bearing relative to the retainer with an accompanying decrease of folding of one ear and an increase of folding of the opposite ear of each pair for shifting radial support therebetween while maintaining uniform transmissibility, said pair of ears in the plane of angular movement between said bearing and retainer being effective to twist to accommodate such movement while said pair of ears disposed generally transverse to said plane of angular movement being effective to roll against said retainer as in axial adjustment.

References Cited by the Examiner
UNITED STATES PATENTS
2,933,354  4/1960  Primeau _____ 308—184

MARTIN P. SCHWADRON, *Primary Examiner.*
FRANK SUSKO, *Examiner.*